Dec. 4, 1934.  J. C. GROFF  1,982,659

PERFORMANCE GAUGING MEANS FOR PRIME MOVERS

Filed July 7, 1930  2 Sheets-Sheet 1

INVENTOR
Joseph C. Groff
BY
Cooper, Kerr & Dunham
ATTORNEYS

Dec. 4, 1934. J. C. GROFF 1,982,659
PERFORMANCE GAUGING MEANS FOR PRIME MOVERS
Filed July 7, 1930  2 Sheets-Sheet 2
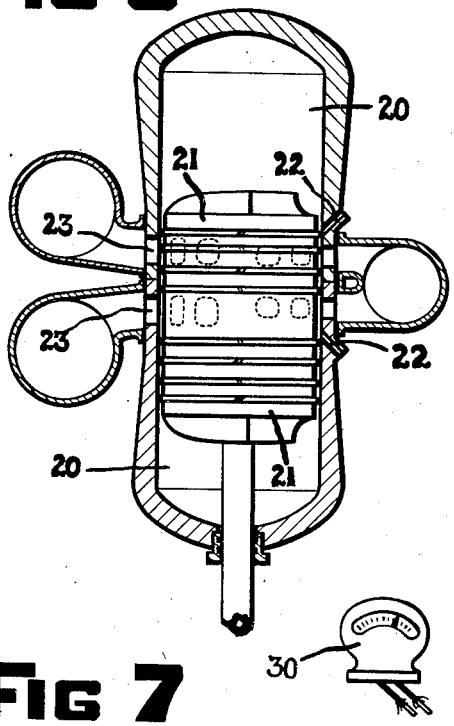
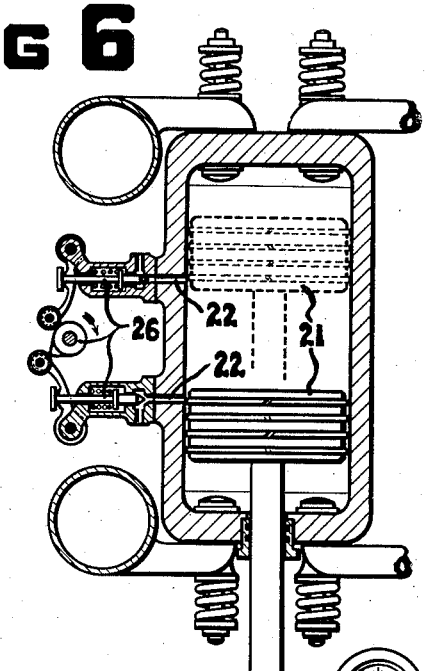
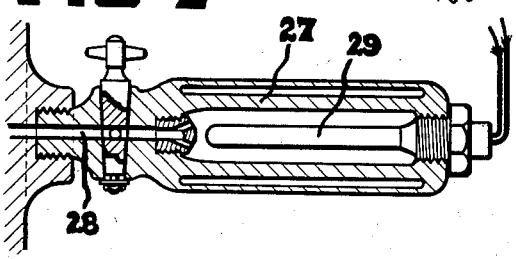
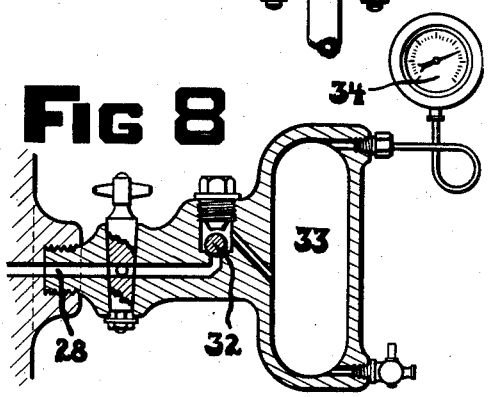
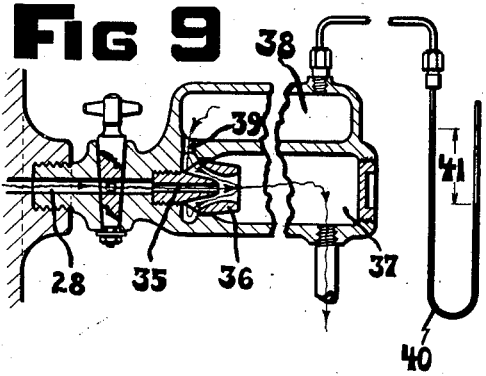
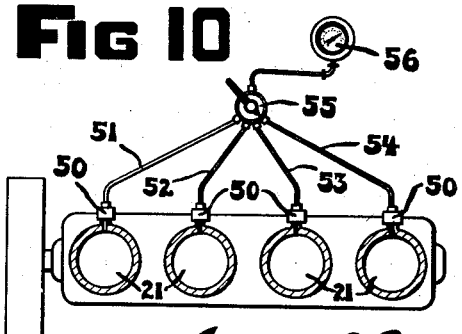
INVENTOR
Joseph C. Groff
BY
Cooper Kerr & Dunlap
ATTORNEYS Patented Dec. 4, 1934

1,982,659

UNITED STATES PATENT OFFICE 1,982,659

PERFORMANCE GAUGING MEANS FOR PRIME MOVERS

Joseph C. Groff, Allentown, Pa.

REISSUED

Application July 7, 1930, Serial No. 466,111

4 Claims. (Cl. 73—51)

This invention relates to an improved gauging device for determining conditions of, and the power developed by, the expansive medium within the power cylinder of a piston type of prime mover.

At the present time it is the common practice to determine the power performance or work performance of piston type prime movers by taking so-called indicator cards and afterwards computing the mean effective pressure from these cards by planimeter operations, etc. Such an operation is laborious and time consuming. Experience has demonstrated that a fairly accurate indication of the engine output conditions can be determined from the instantaneous condition existing in the cylinder just prior to the release of the expansive medium from the cylinder by the usual exhaust valves or ports.

The present invention utilizes this fact to enable the relative gauging to be made of conditions within the power cylinder and obviate the use of the usual indicator card devices which have heretofore been employed.

One object of the present invention resides in the provision of a gauging port located in the bore of the cylinder and in position to be uncovered by the power piston substantially just prior to the instant of the release of the expansive medium from the cylinder by the usual means. Associated with such gauging port is a suitable condition determining means which may be of a variety of types as will be hereinafter set forth.

A further object of the present invention resides in the provision of a gauging means to permit the averaging of a number of successive instantaneous determinations whereby a general average of the performance of the engine may be secured.

Another object of the present invention resides in the provision of a gauging means for determining the performance of the prime mover of the power piston type in which pressure determinations may be secured which may be kept coordinated to indicate the work and power developed by the engine by the comparison with established standards.

A further object of the present invention resides in the provision of a gauging means adapted for use with a prime mover of the power piston type and in which prime mover a multiplicity of cylinders are provided, the gauging means being arranged to permit a relative comparison to be made of the conditions instantaneously existing in the various cylinders with respect to each other during the running of the engine.

Further and other objects of the present invention will be hereinafter set forth in the accompanying specification and claims and shown in the drawings which by way of illustration show what I now consider to be preferred embodiments of the invention.

In the drawings:

Figure 1 is a secitonal view of a piston type of prime mover of the four cycle single acting Diesel type of internal combustion engine with my improved gauging port;

Fig. 2 indicates a typical indicator card such as would be taken from a prime mover of the type shown in Fig. 1, under maximum load (shown in full lines) and fractional load conditions (shown in dashed lines);

Fig. 5 shows the arrangement of multiple gauging ports upon a two cycle double acting type of internal combustion engine;

Fig. 6 shows the relation of gauging ports on a four cycle double acting type of internal combustion engine;

Fig. 7 shows one embodiment of the condition determining device which may be used, in which a temperature reading is taken of the conditions in the engine;

Fig. 8 is another embodiment of the determining device in which pressure determinations are made of the operating conditions;

Fig. 9 is a view showing a different embodiment of the determining device in which a manometer type of pressure reading device is employed and in which Venturi means are provided for controlling and averaging the action upon the manometer; and Fig. 10 is an illustration of the determining devices as applied to a multi-cylinder engine and in which means is provided for individually observing the relative operating conditions in the different cylinders.

Figure 1:
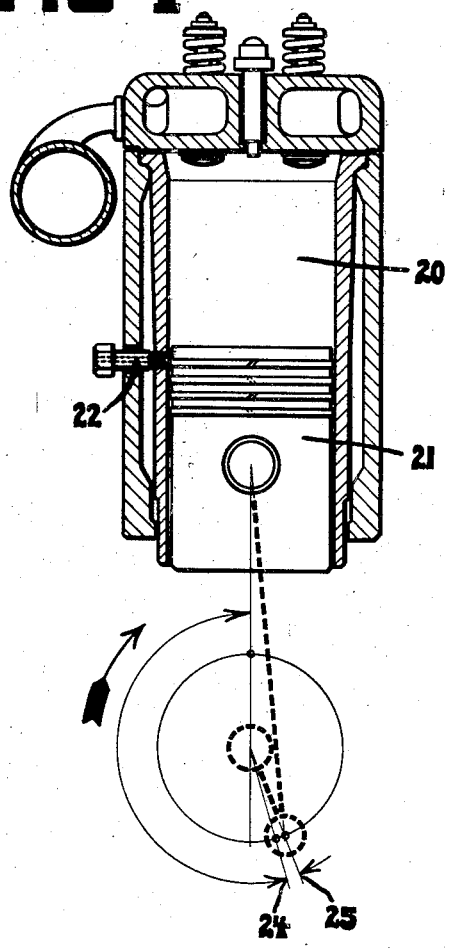

Referring now to the drawings, in more detail in Fig. 1, 20 is the engine cylinder provided with the usual inlet and exhaust valves and with a reciprocating power piston 21. Extending through the side wall of the bore of the cylinder 20 is a gauging port generally designated 22 and placed in such position with respect to the piston that the gauging port is adapted to be uncovered by the piston substantially at the instant just prior to the time when the exhaust valve opens and permits the release of the expanding medium from the cylinder to the outside air.

Figure 3:
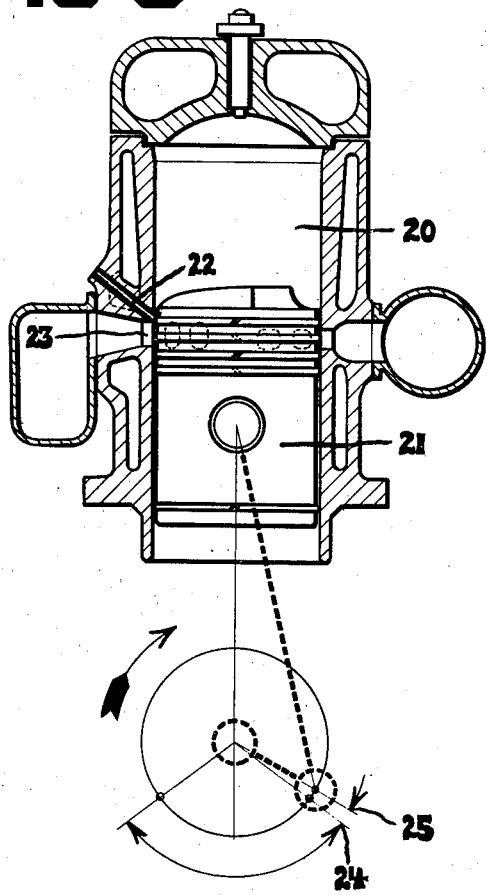
Fig. 3 is a view showing my improved gauging means as applied to a single acting two cycle Diesel type of internal combustion engine.
Figure 2:
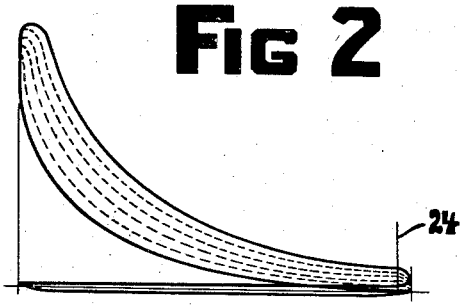
Figure 4:
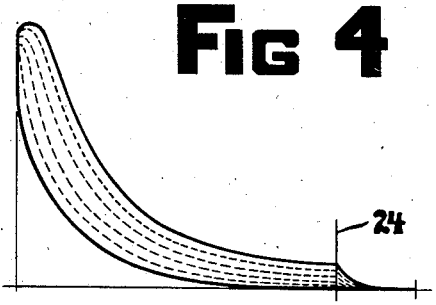
Fig. 4 shows the indicator cards which would be taken from a prime mover of the type shown in Fig. 3, under maximum load (shown in full lines) and fractional load conditions (shown in dashed lines)

In Fig. 3 the same reference numerals are applied to similar parts. It will be noted in this figure that the gauging port 22 is disposed slightly above the top of the exhaust ports which are conventionally provided in two cycle engines. The exhaust ports in this view are designated 23. Experience has demonstrated that a comparative gauge of the performance of an engine can be made by an accurate measurement of the pressure existing in the cylinder just before the instant of release of the medium from the cylinder by the exhaust valve or by the exhaust port in a two cycle engine. On the indicator cards shown in Figs. 2 and 4 such exhaust release point is indicated by the line 24. In Figs. 1 and 3 the position of the gauging port in the cylinder wall with respect to the piston is such that the gauging port is opened up by the piston just before this exhaust release instant. Such point of prior opening of the gauging port in Figs. 1 and 3 is indicated by reference numeral 25, reference numeral 24 being likewise applied to these figures for comparison with Figs. 2 and 4.

Referring now to Fig. 5, in this embodiment there is a double acting two cycle type of piston which will be given the same reference numeral 21 operating in cylinder 20, and in order to determine the conditions existing in each end of the cylinder, two gauging ports 22 are provided, one cooperating with one end of the piston and the other with the other end. As in Fig. 3, ports 22 are adapted to be uncovered by the piston just prior to the uncovering by the piston of the exhaust ports 23. Assuming piston 21 to be moving downwards, the top gauging port 22 is shown as about to be uncovered by the upper part of said piston, and slightly in advance of the uncovering of the upper exhaust ports 23.

In Fig. 6 a double acting type of four cycle engine is shown and with this embodiment two gauging ports 22 are likewise provided one of which is uncovered by the top end of the piston and the other of which is uncovered by the bottom end of the piston to determine the conditions existing in each end of the cylinder.

However, with this type of engine in view of the fact that when the piston is approaching one end, for example the lower end, the upper port will be completely uncovered at an incorrect time during which combustion and expansion is taking place in the upper end, and provision must be made for closing off the upper port at this time and for keeping the lower gauging port 22 open and vice versa. This is accomplished by the valving mechanism generally designated at 26 and operated in any suitable way from the engine crank shaft.

Thus, the upper part of piston 21 cooperates with the lower gauging port 22 to determine the performance of the top end of cylinder 20, and as indicated by the dotted line position of piston 21, its lower part cooperates with the upper gauging port 22 to determine the performance of the bottom end of the piston.

The determining devices will now be explained. In making determinations, while an engine is operated with the gauging port and where a gauging port is utilized, it will be appreciated that a number of successive samples are taken, so to speak, of the expansive medium within the power cylinder upon each uncovering of the gauging port during successive piston operations. Provision must be made for averaging these samples or averaging successive and intermittent readings. One means of determining the conditions and of averaging readings is shown in Fig. 7. Here a chamber generally designated 27 is provided having its interior in communication with the gauging port through a valved conduit 28. Within the vessel 27 is a pyrometer element 29 of any conventional type. Such element is connected to the usual temperature indicating instrument 30 which may be of any type.

It will be understood that each time the gauging port is uncovered by the piston a small quantity of hot "pre-exhaust" gas will be admitted into the interior of the vessel 27 and this intermittent supply of hot gas will serve to maintain a uniform average temperature which will be indicated at 30. Preferably the vessel 30 is insulated to prevent successive dissipation of heat therefrom to the atmosphere. The temperature reading at an instant just prior to the exhaust release point 24 (i. e. at point 25, see Figs. 1 and 3, at which point 25 is at an instant just prior to point 24) will give a comparative measure of the work developed within the power cylinder and particularly will do this when this temperature reading is compared with previously established standards. It will be appreciated that the arrangement of determining device of Fig. 7 will take into account the hot "pre-exhaust" gases only and will not be effected by the uncertain cooling effects of the scavenging air introduced within the power cylinder during exhaust action in the case of a two cycle type of engine. With this embodiment of the invention it will be noted that no check valve is provided in conduit 28. It is intended that there be a back and forth flow of the medium through the conduit 28. At the pre-exhaust point 25, the medium would flow from the power cylinder of the engine through 28 and into the chamber 27, and thus provide a heating pulse, so to speak, for thermo-couple 29. Following this impulse flow to the right there would be a flow to the left from the chamber 27 into the power cylinder of the engine via conduit 28. It is intended to have a back and forth flow to get a fresh pulse of heated gas to element 29 on each stroke.

Fig. 8 shows a different embodiment of determining device wherein the valved conduit 28 is provided as before leading to the gauging port. This conduit 28 being provided with a ball check 32 which admits the gases into a pressure averaging chamber 33. A conventional pressure gauge 34 is used to show the average pressure conditions in chamber 33 which will be understood to closely approximate the average pressure conditions existing in the power cylinder just prior to the instant of exhaust.

It will be understood that the pressure gauge 34 can be calibrated to read directly in terms of work developed in the power cylinder and from this reading the power developed can be readily ascertained by an observation of the speed conditions and with a relative comparison with previously established standards. If desired, the pressure gauge 34 could be calibrated with a plurality of graduations for different engine speeds and in this way instant direct power readings can be obtained.

According to the embodiment shown in Fig. 9, the valve conduit 28 leads to a nozzle 35 which discharges into a venturi 36. The venturi in turn discharges into chamber 37 which is preferably open to the atmosphere, either directly, or via the exhaust pipe of the engine. A supplemental averaging chamber 38 is provided having a port 39 which leads to the entrance end of the venturi. A manometer generally designated 40 is connected to chamber 38. This manometer may be located at any desired point even at distances considerably remote from the engine. In operation the puffs of gas which are intermittently discharged from the venturi create a negative pressure 41 in chamber 38 and this negative pressure is uniformly maintained by providing a comparatively large size volume for chamber 38 and a comparatively small port opening 39. With this determining device, the average pressure conditions in the engine cylinder just prior to the instant of exhaust action may be determined as before. The manometer 40 in effect gives a relayed reading which is proportional to the "pre-exhaust" pressure in the engine cylinder, the pressure in the engine cylinder effecting the velocity through the venturi. With the embodiment of the invention shown in Fig. 9, a gauge of engine performance condition is intended to be taken based on the outflow from the cylinder, such outflow being the flow to the right in conduit 28. An inflow condition exists only on the completion of the intake stroke of a four cylinder engine. It is desired that this intake flow condition be disregarded and this is accomplished by the arrangement of the venturi 36 and the small port 39 leading into the averaging chamber 38. It will be understood that the back flow through 28 is less than the outflow because the pressure differential between 37 and the engine cylinder is very slight at the end of the intake stroke. On the other hand, upon outflow there is a considerable pressure differential between the cylinder and the chamber 37. This considerable pressure differential is sufficient to introduce a suction effect by venturi 36 and cause a flow of medium through port 39. The inflow, however, is so much less in velocity of puff that there is no considerable appreciable diminution of pressure in 38 by the inflow. In other words, the outflow predominates over the inflow condition.

Referring now to Fig. 10, here a multiple cylindered engine is shown and while four cylinders 21 are illustrated it is obvious that there can be any desired number and these cylinders can be of any type. The parts generally designated 50 comprise any of the determining devices shown in Figs. 7, 8 or 9 and from these determining devices individual leads 51, 52, 53 and 54 extend to a selector mechanism usually designated 55 which is adapted to selectively establish the communication with a common reading instrument 56. This reading instrument may be of any of the types previously mentioned.

By this construction it will be appreciated that selective comparative readings can be taken of the conditions in each cylinder and these conditions can be compared with the conditions in any other cylinder. Furthermore, the common reading instrument 56 obviates the discrepancies which might occur if separate reading instruments were utilized for each cylinder. While the foregoing gauging device has been described in detail in connection with internal combustion engine applications, it will be understood that the gauging means employed can also be utilized in steam engines as well wherein reciprocating pistons are utilized.

I claim:

1. A performance gauging means to provide an indication for apportioning the power developed by a multi-cylinder piston type of prime mover among the individual cylinders wherein an expansive power medium works against and displaces reciprocating power pistons, said cylinders being provided with the usual means for releasing and exhausting the expanding medium upon substantial completion of the expansion stroke, said gauging means comprising in combination, a single gauging ported passage which is located in the bore of each cylinder and in position to be automatically uncovered by the power piston itself substantially just before the instant of release of the expanding medium from the power cylinder and means associated with the gauging port for determining the pre-exhaust pressure conditions existing in each power cylinder just prior to the release and exhaust of the expansive medium, which conditions are indicative of the power developed by the respective cylinder, whereby the power developed by the engine may be equally apportioned among the individual cylinders through adjustment of the supply of power medium to each cylinder.

2. An apparatus for gauging the power performance of piston type prime movers of the multi-cylinder type and for checking the equality of power developed by each of the respective cylinders, comprising a single ported passage in each cylinder which is located along the bore in the side wall of each cylinder and in position to be automatically uncovered by the piston itself at an instant commencing only during the latter part of the expansion stroke of the piston and also substantially at an instant just prior to the initial exhaust of the expanding medium from the power cylinder, and means adapted to be placed in communication with each of said ports for giving an indication of pre-exhaust pressure conditions which exist in each power cylinder at the time of uncovering each of the ports by each of the pistons respectively, which conditions are indicative of the power developed by the respective cylinder, to thereby show the power performance of the engine and to show the relative power performance of each cylinder thereof.

3. The invention set forth in claim 2 in which the indicating means comprises a pressure indicating device.

4. The invention set forth in claim 2 in which the indicating means comprises a temperature indicating device for indicating temperatures which are coordinated with pre-exhaust pressure conditions in the cylinder.

JOSEPH C. GROFF.